United States Patent
Bachmann

(10) Patent No.: US 11,465,577 B2
(45) Date of Patent: Oct. 11, 2022

(54) SPRING ELEMENT FOR FASTENING AN AIR BAG MODULE TO A VEHICLE STEERING WHEEL, AND STEERING WHEEL ASSEMBLY COMPRISING SUCH A SPRING ELEMENT

(71) Applicant: ZF AUTOMOTIVE SAFETY GERMANY GMBH, Aschaffenburg (DE)

(72) Inventor: Stefan Bachmann, Heimbuchenthal (DE)

(73) Assignee: ZF AUTOMOTIVE SAFETY GERMANY GMBH, Aschaffenburg (DE)

( * ) Notice: Subject to any disclaimer, the term of this patent is extended or adjusted under 35 U.S.C. 154(b) by 24 days.

(21) Appl. No.: 16/641,675

(22) PCT Filed: Aug. 10, 2018

(86) PCT No.: PCT/EP2018/071769
§ 371 (c)(1),
(2) Date: Feb. 25, 2020

(87) PCT Pub. No.: WO2019/042744
PCT Pub. Date: Mar. 7, 2019

(65) Prior Publication Data
US 2020/0384937 A1      Dec. 10, 2020

(30) Foreign Application Priority Data
Aug. 30, 2017    (DE) ................ 10 2017 119 886.5

(51) Int. Cl.
*B60R 21/203*      (2006.01)
(52) U.S. Cl.
CPC .................... *B60R 21/2037* (2013.01)

(58) Field of Classification Search
CPC .............. B60R 21/203; B60R 21/2037; B60R 2021/2173; B60R 2021/2175
See application file for complete search history.

(56) References Cited

U.S. PATENT DOCUMENTS 6,276,711 B1 * 8/2001 Kurz ................... B60R 21/2035
                                                                  280/728.2
6,554,312 B2 * 4/2003 Sakane ................. B60Q 5/003
                                                                  280/728.2
(Continued)

FOREIGN PATENT DOCUMENTS

| DE | 102015012700 | 4/2017 |
| EP | 1179457 | 2/2002 |
| JP | 2002002433 | 1/2002 |

*Primary Examiner* — Barry Gooden, Jr.
(74) *Attorney, Agent, or Firm* — Tarolli, Sundheim, Covell & Tummino LLP

(57) ABSTRACT

The invention relates to a spring element (10) for fastening an airbag module (12) to a vehicle steering wheel (14), having a first spring section (16) which extends from a tool access point (P) via a first bearing point (18) as far as a first free spring end (20), and a second spring section (22) which extends from the tool access point (P) via a second bearing point (24) as far as a second free spring end (26), wherein the tool access point (P) is spaced apart from a connecting section (28) between the two free spring ends (20, 26), wherein the tool access point (P) is spaced apart from a connecting section (28) between the two free spring ends (20, 26) and is displaceable in an actuating direction (x) toward the connecting section (28), and wherein the spring sections (16, 22) are shaped such that the free spring ends (20, 26) move toward each other or away from each other during a displacement of the tool access point (P) in the actuating direction (x) if the first bearing point (18) and the second bearing point (24) are held substantially non-displaceably in the actuating direction (x).

18 Claims, 6 Drawing Sheets

(56) References Cited

U.S. PATENT DOCUMENTS

| | | | | |
|---|---|---|---|---|
| 6,675,675 | B1* | 1/2004 | Sauer | B60R 21/2037 |
| | | | | 280/731 |
| 7,055,854 | B2* | 6/2006 | Jones | B60R 21/2037 |
| | | | | 280/731 |
| 7,185,915 | B2* | 3/2007 | Fujita | B60R 21/2037 |
| | | | | 280/731 |
| 7,533,897 | B1* | 5/2009 | Xu | B60Q 5/003 |
| | | | | 280/728.2 |
| 10,272,871 | B2* | 4/2019 | Kienzner | B60R 21/217 |
| 10,369,954 | B2* | 8/2019 | Eck | B60R 21/26 |
| 10,513,238 | B2* | 12/2019 | Von Roden | B60R 21/261 |
| 10,926,698 | B2* | 2/2021 | Gothekar | B60Q 5/003 |
| 2001/0054810 | A1* | 12/2001 | Sakane | B60R 21/2037 |
| | | | | 280/728.2 |
| 2003/0173759 | A1* | 9/2003 | Grenier | B60R 21/2035 |
| | | | | 280/728.2 |
| 2005/0017484 | A1* | 1/2005 | Worrell | B60Q 5/003 |
| | | | | 280/731 |
| 2012/0313357 | A1* | 12/2012 | Yamaji | B60R 21/203 |
| | | | | 280/731 |
| 2018/0312128 | A1* | 11/2018 | Von Roden | B60R 21/272 |
| 2019/0225178 | A1* | 7/2019 | Kolosick | B60R 21/203 |
| 2019/0275976 | A1* | 9/2019 | Ko | B60R 21/2037 |
| 2020/0216007 | A1* | 7/2020 | Bachmann | B60R 21/231 |
| 2020/0324726 | A1* | 10/2020 | Ko | B60R 21/2037 |
| 2022/0017035 | A1* | 1/2022 | Kim | B60R 21/2037 |
| 2022/0055564 | A1* | 2/2022 | Hayakawa | B60R 21/203 |

* cited by examiner

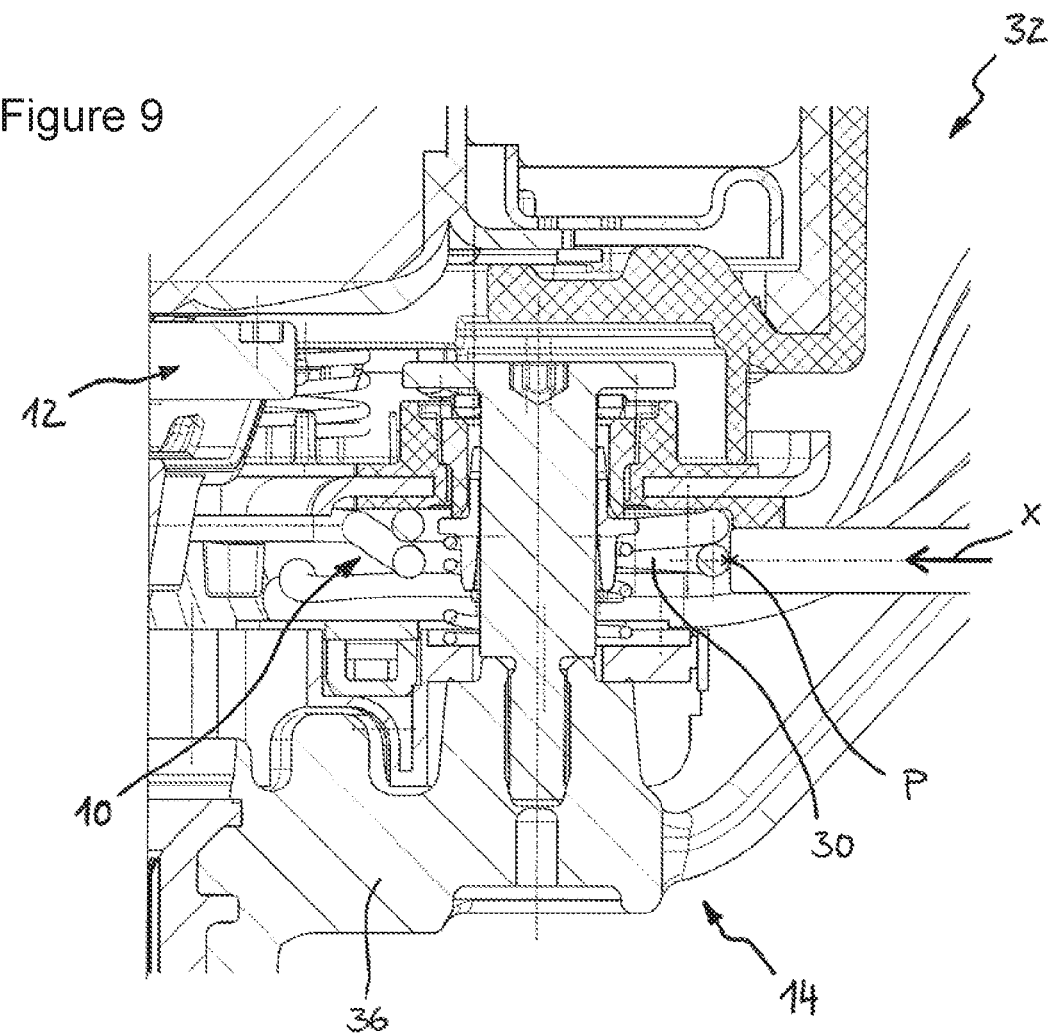

SPRING ELEMENT FOR FASTENING AN AIR BAG MODULE TO A VEHICLE STEERING WHEEL, AND STEERING WHEEL ASSEMBLY COMPRISING SUCH A SPRING ELEMENT

RELATED APPLICATIONS

This application corresponds to PCT/EP2018/071769, filed Aug. 10, 2018, which claims the benefit of German Application No. 10 2017 119 886.5, filed Aug. 30, 2017, the subject matter of which are incorporated herein by reference in their entirety.

BACKGROUND OF THE INVENTION

The invention relates to a spring element for fastening an airbag module to a vehicle steering wheel, having a first spring section which extends from a tool access point via a first bearing point as far as a first free spring end as well as a second spring section which extends from the tool access point via a second bearing point as far as a second free spring end, wherein the tool access point is spaced apart from a connecting section between the two free spring ends and is displaceable in art actuating direction toward the connecting section.

Furthermore, the invention also relates to a steering wheel assembly comprising such a spring element.

In order to mount an airbag module to a vehicle steering wheel, in the automotive industry currently snap-locks are wide-spread in which rigid retaining hooks are associated with the airbag module and elastic spring brackets are associated with a steering wheel skeleton of the vehicle steering wheel, for example. With respect to a steering wheel axis, the airbag module can be locked quickly and easily on the vehicle steering wheel by axial pressure toward the steering wheel skeleton, which brings about a very reliable and resistant fastening of the module.

For a desired exchange of the airbag module and for maintenance or repair works on the vehicle steering wheel, the mounted airbag module initially has to be disassembled again, however, which has been difficult so far for various reasons. For example, disassembly is possible by using special tools only, involves undesirably large space required in the vehicle steering wheel and/or high expenditure of energy or time to the assembler.

For example, in EP 1 179 457 A1, a generic spring element for fastening an airbag module to a vehicle steering wheel is disclosed, comprising a central arm for actuating the spring element and two opposite side arms for locking the spring element by associated retaining hooks, each of the side arms having an inclined segment which abuts on a stop surface. When disassembling the airbag module, the entire spring element performs a translational movement, the inclined segments being loaded against the stop surfaces and sliding along the latter. In so doing, the spring element is deformed such that the side arms move away from each other or towards each other for releasing the retaining hooks. In order to enable the translational movement of the entire spring element, an undesirably large space is required in the actuating direction within the steering wheel assembly, however. Further, due to the friction and the necessary deformation of the spring element, especially high expenditure of energy of the assembler and very robust stop surfaces are required to release the retaining hooks in the afore-described manner.

SUMMARY OF THE INVENTION

It is the object of the invention to provide a spring element by which an airbag module can be mounted quickly and reliably via a snap-lock to a vehicle steering wheel but can also be removed from the vehicle steering wheel with low effort.

In accordance with the invention, this object is achieved by a spring element of the type mentioned in the beginning in which the spring sections are shaped so that the free spring ends move away from each other or toward each other during a displacement of the tool access point in the actuating direction, when the first bearing point and the second bearing point are held substantially non-displaceably in the actuating direction. Due to the bearing points being held largely non-displaceably in the actuating direction, no translational movement of the spring element in the actuating direction is performed between the bearing points and the free spring ends so that a space required for the spring element is significantly reduced. By the way, such translation is not necessary for the function, either, as for the release of retaining hooks a movement of the free spring ends away from each other or toward each other is sufficient.

Preferably, the two spring sections are configured to be substantially symmetric with respect to a spring axis extending through the tool access point, especially wherein the actuating direction coincides with an axial direction of the spring axis.

In accordance with one embodiment of the spring element, between the two bearing points at least one coiled spring section is provided. The elasticity of the spring element can be influenced via the material, the material thickness, the number of windings and/or the winding diameter of the coiled spring section and thus a desired actuating force can be adjusted, for example.

The tool access point may be provided at the at least one coiled spring section. Alternatively, it is also imaginable that between the two bearing points two coiled spring sections are provided, with the tool access point being disposed between said two spring sections, especially substantially centrally between the two spring sections.

In accordance with a preferred embodiment, the first spring section and the second spring section are intersecting. Thus, the free spring ends are moved toward each other in the actuating direction, when the spring element is actuated at the tool access point, resulting in a compact design of the spring element in the radial direction. Further, due to the intersection, longer lever arms are resulting between the bearing point and the respective associated free spring end.

Preferably, the spring element is made from bent spring wire as a one-piece component. Wire can be easily adapted as to its characteristics, for example, via its cross-section or its material composition and with low effort can be individually shaped and manufactured at low cost.

In accordance with another embodiment of the spring element, a respective spring leg including a retaining portion extends between the bearing point and the associated free spring end of the spring sections. The retaining portion of the spring leg preferably abuts directly on the free spring end and moreover can extend substantially in parallel to the spring axis. Since the spring element ends just behind the retaining portions, advantageously an especially small space is required.

Preferably, in this embodiment a space between the bearing point and the associated retaining portion is larger, especially at least three times larger, than a space between the bearing point and the tool access point. When the spring element is actuated for removing the airbag module from the vehicle steering wheel, consequently an actuating distance at the tool access point is shorter, especially significantly shorter than an unlocking distance of the retaining portions.

The spring legs of the spring element are substantially Z-shaped, for example. Thus, a central hub area of the vehicle steering wheel is not intersected by the spring element so that a gas generator and the electric leads thereof may be provided unhindered in this area.

In accordance with the invention, the afore-mentioned object is also achieved, for the rest, by a spring element for fastening an airbag module to a vehicle steering wheel, comprising a first spring section extending from a tool access point via a first bearing point as far as a first spring end and a second spring section extending from the tool access point via a second bearing point as far as a second spring end, wherein the spring sections are intersecting between the tool access point and their spring ends, especially between their bearing points and their spring ends. Due to the intersection, an especially long lever arm is resulting between the bearing point and the respectively associated free spring end so that at the free spring end comparatively long unlocking distances are advantageously resulting from short actuating distances at the tool access point.

Moreover, the invention comprises a steering wheel assembly of a vehicle, having an afore-described spring element and an assembly component to which the spring element is fastened, the assembly component including a spring bearing abutting on the first bearing point and another spring bearing abutting on the second bearing point. The spring bearings of preference are in the form of pivot bearings or radial bearings exclusively permitting rotation of the spring element. In particular, no plain bearings are provided which would permit a translational movement of the entire spring element in the actuating direction.

In one embodiment of the steering wheel assembly, the assembly component is a steering wheel skeleton, an airbag module or a separate fastening element which can be tightly mounted to the steering wheel skeleton or to the airbag module.

BRIEF DESCRIPTION OF THE DRAWINGS

Further features and advantages of the invention will be evident from the following description of a preferred embodiment with reference to the drawings, wherein:

FIG. 9 shows a detail cutout of FIG. 8 in the area of a tool access point.

DESCRIPTION

Figure 1:
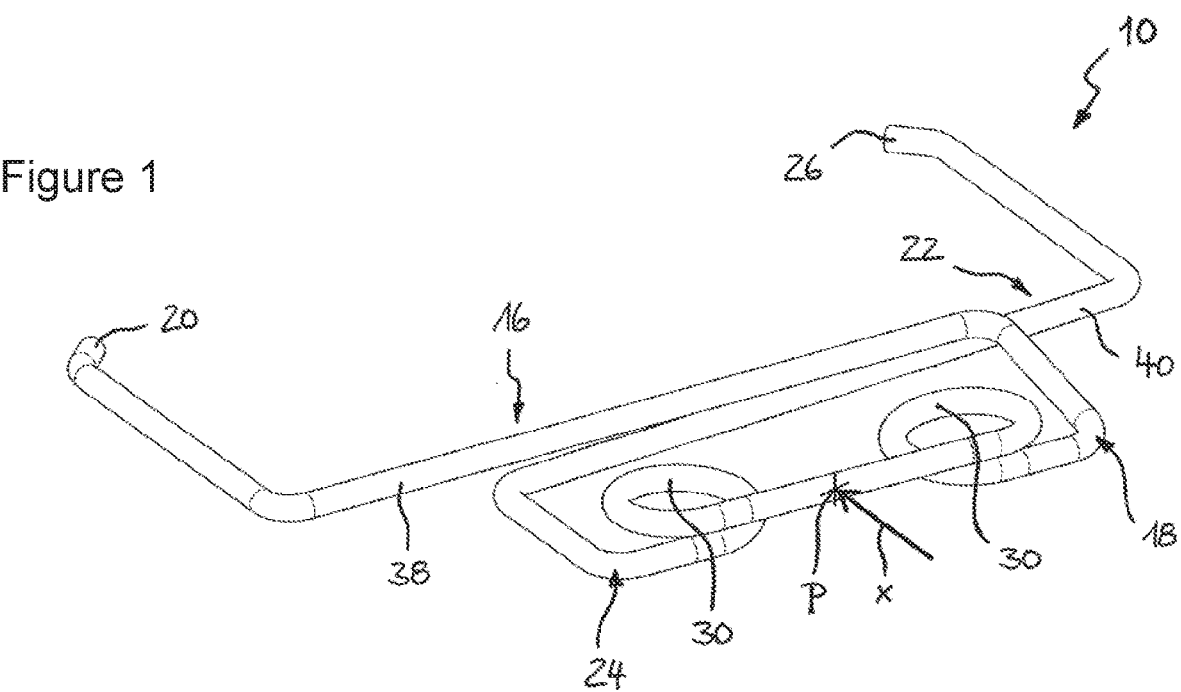
FIG. 1 shows a perspective view of a spring element according to the invention for fastening an airbag module to a vehicle steering wheel.
Figure 2:
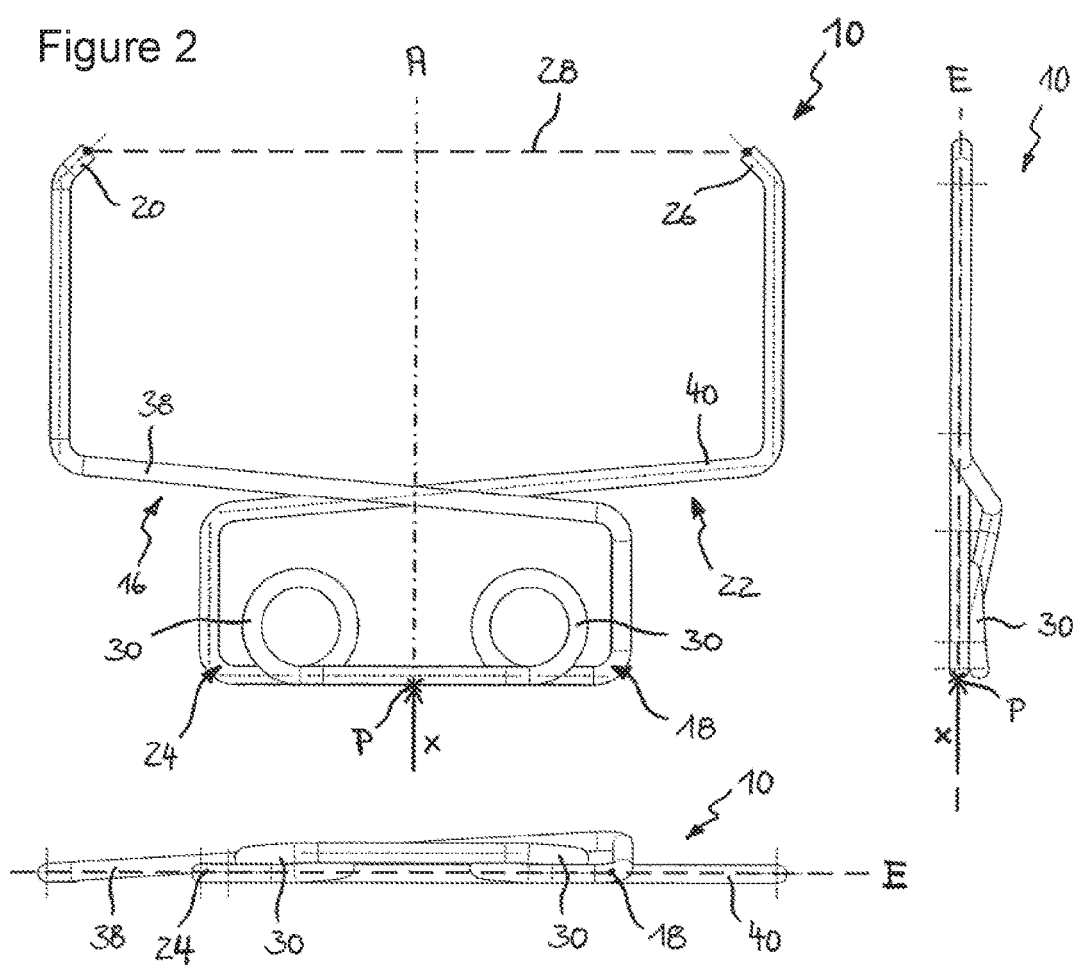
FIG. 2 shows a top view and lateral views of the spring element according to FIG. 1.

FIGS. 1 and 2 illustrate a spring element 10 for fastening an airbag module 12 to a vehicle steering wheel 14 (cf. also FIGS. 8 and 9), comprising a first spring section 16 which extends from a tool access point P via a first bearing point 18 as far as a first free spring end 20 and a second spring section 22 which extends from the tool access point P via a second bearing point 24 as far as a second free spring end 26, wherein the tool access point P is spaced apart from a connecting section 28 between the two free spring ends 20, 26 and is displaceable in an actuating direction x toward the connecting section 28. The spring sections 16, 22 are shaped such that the free spring ends 20, 28 move toward each other or away from each other during displacement of the tool access point P in the actuating direction x if the first bearing point 18 and the second bearing point 24 are held substantially non-displaceably in the actuating direction x.

The spring element 10 in this case is a one-piece component made from bent spring wire and consequently can be manufactured easily and at low cost.

The two spring sections 16, 22 are configured to be substantially symmetric with respect to a spring axis A extending through the tool access point P, with the actuating direction x coinciding with an axial direction of the spring axis A.

According to FIGS. 1 and 2, between the two bearing points 18, 24 of the spring element 10 two coiled spring sections 30 are provided, with the tool access point P being arranged between said two coiled spring sections 30.

In general, between the two bearing points 18, 24 preferably at least one coiled spring section 30 is provided so as to ensure a desired elastic deformation of the spring element 10 with a predetermined actuating force in the actuating direction x. Accordingly, alternatively to the shown example embodiment, also embodiments of the spring element 10 in which the tool access point P is provided at the at least one coiled spring portion 30 are imaginable.

For the rest, it is clearly evident from FIG. 2 that the first spring section 16 and the second spring section 22 of the spring element 10 are intersecting. Said intersection enables, due to the lever ratios occurring, comparatively large movements of the free spring ends 20, 26 already in the case of small displacements of the tool access point P in the actuating direction x.

Because of this advantageous design, a spring element 10 comprising a first spring section 16 which extends from a tool access point P via a first bearing point 18 to a first spring end 20 and a second spring section 22 which extends from the tool access point P via a second bearing point 24 to a second spring end 26, with the two spring sections 16, 22 intersecting between the tool access point P and their spring ends 20, 26, especially between their bearing points 18, 24 and their spring ends 20, 26, is inventive already on its own.

By way of the lateral views according to FIG. 2, it becomes furthermore apparent that the spring element 10 extends substantially in a spring plane E, with a steering axis S of the vehicle steering wheel 14 (see FIG. 8) extending substantially normal to said spring plane E. Transversely to the spring plane E, a dimension of the spring element 10 largely corresponds to a diameter of the spring wire. Merely in the area of the intersection and the at least one coiled spring section 30, the dimension transversely to the spring plane E corresponds to approximately twice the diameter of the spring wire. With respect to the steering axis S, the space of the spring element 10 required in the axial direction is thus minimum.

Figure 3:
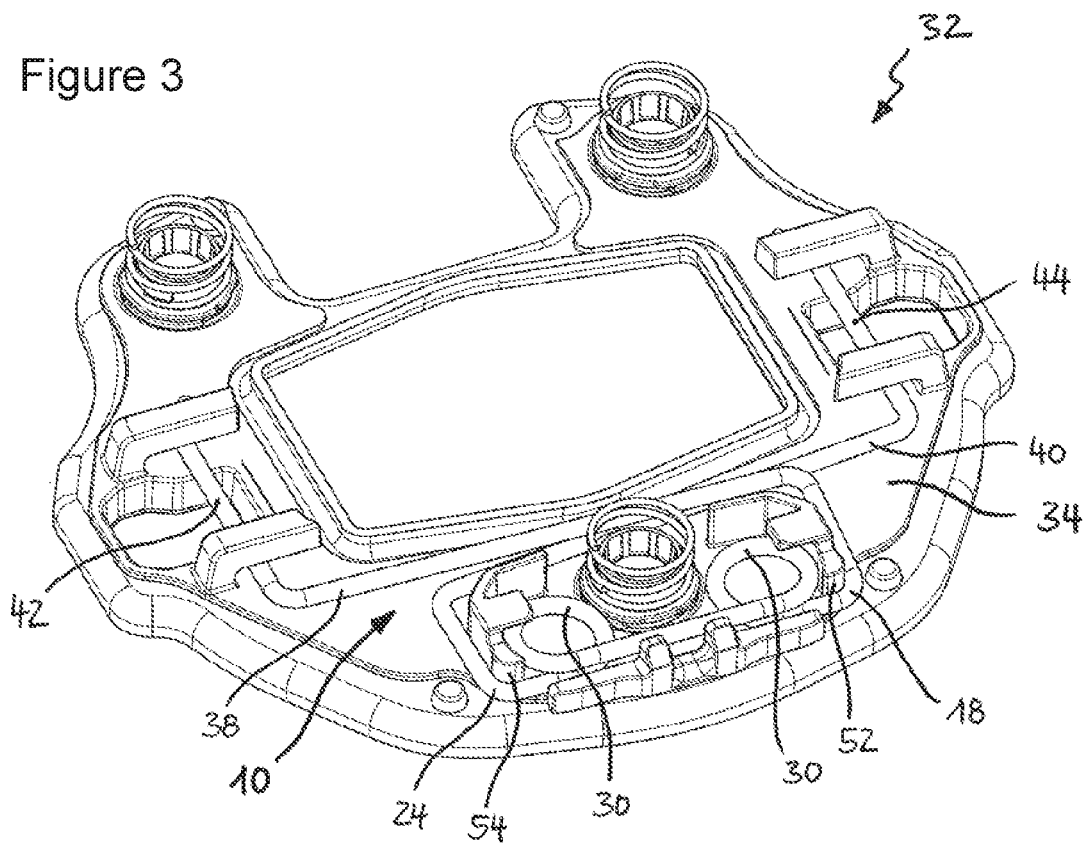
FIG. 3 shows a perspective view of a steering wheel assembly according to the invention having a mounted spring element according to FIGS. 1 and 2.
Figure 4:
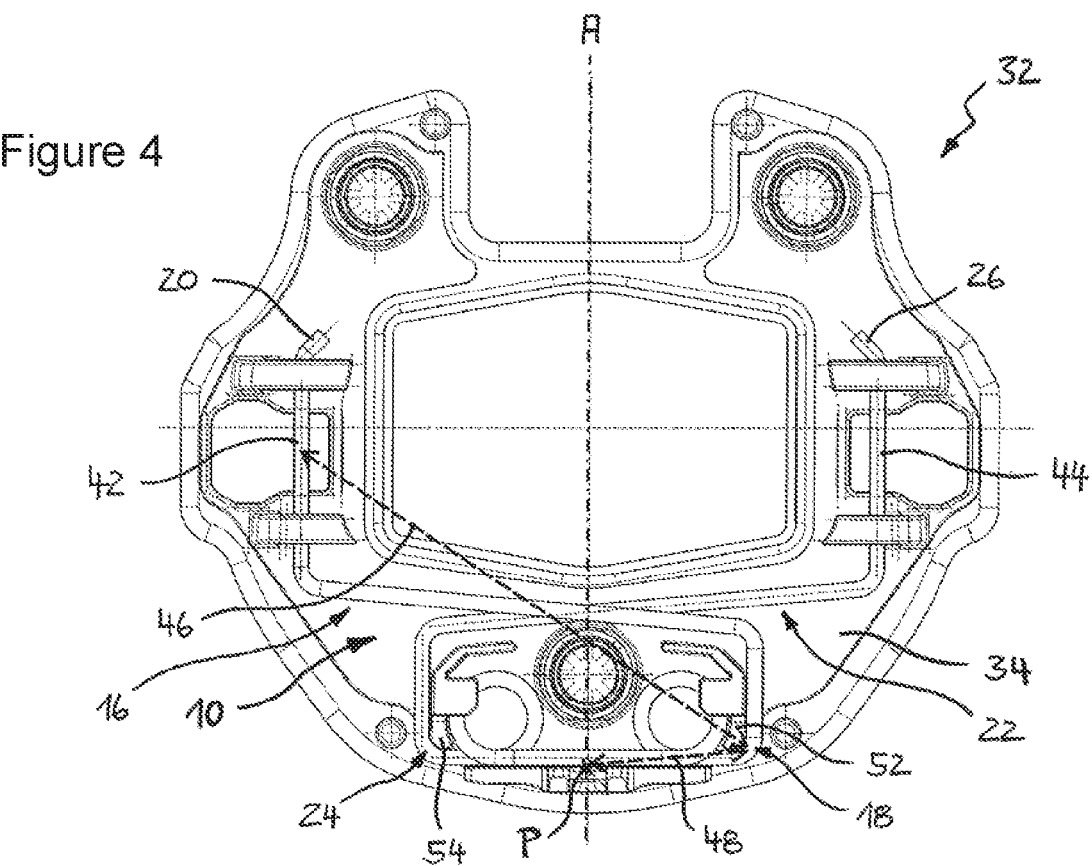
FIG. 4 shows a top view of the steering wheel assembly according to FIG. 3.
Figure 8:
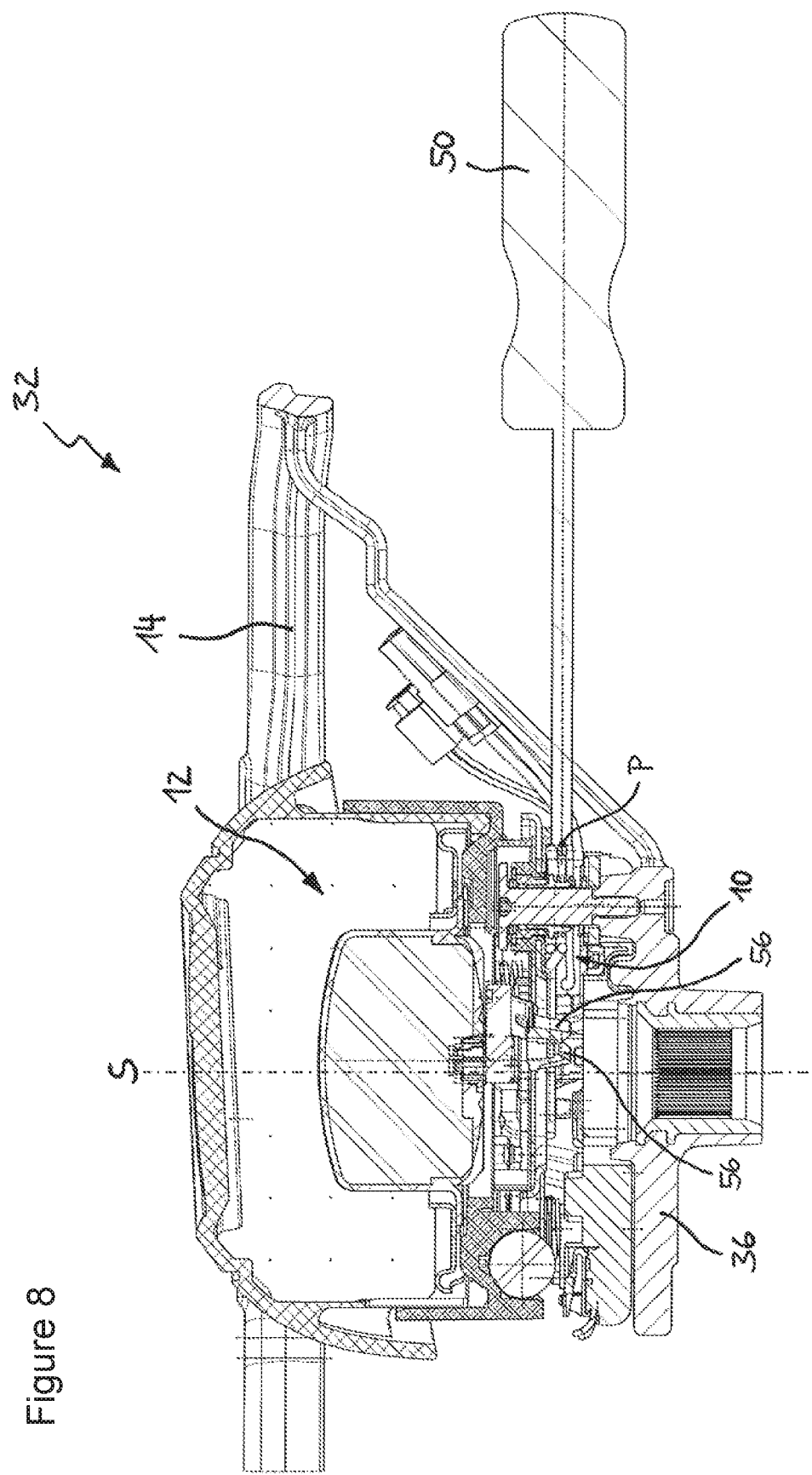
FIG. 8 shows a section across a steering wheel assembly according to the invention comprising a mounted spring element according to FIGS. 1 and 2.

FIGS. 3 and 4 illustrate views of an assembly component for a steering wheel assembly 32 according to FIGS. 8 and 9, wherein a spring element 10 according to FIGS. 1 and 2 is mounted to the assembly component. The assembly component in the present example embodiment is a separate fastening element 34 which may be tightly connected, for example screwed, to the airbag module 12 or to a steering wheel skeleton 36 of the steering wheel assembly 32. However, it is also imaginable as an alternative that the fastening element 34 is formed integrally in the airbag module 12 or the steering wheel skeleton 36 and thus the spring element 10 is fastened directly to the airbag module 12 or the steering wheel skeleton 36.

A respective spring leg 38, 40 having a retaining portion 42, 44 extends between the bearing point 18, 24 and the associated free spring end 20, 26 of the spring sections 16, 22. The retaining portion 42, 44 abuts on the free spring end 20, 26 and, in the present case, extends substantially in parallel to the spring axis A. The spring element 10 engages, in the area of the retaining portions 42, 44, in retaining hooks 56 of the airbag module 12 (see FIG. 8) or of the vehicle steering wheel 14 to establish a snap-lock between the airbag module 12 and the vehicle steering wheel 14.

Each of the spring legs 38, 40 is substantially Z-shaped.

With respect to a spring section 16, 22, according to FIG. 4 a space 46 between the bearing point 18, 24 and the associated retaining portion 42, 44 is larger, especially at least three times larger, than a space 48 between the bearing point 18, 24 and the tool access point P. Upon actuation of the spring element 10 for removing the airbag module 12 from the vehicle steering wheel 14, an actuating distance at the tool access point P consequently is significantly shorter than an unlocking distance of the retaining portions 42, 44.

Figures 5, 6:
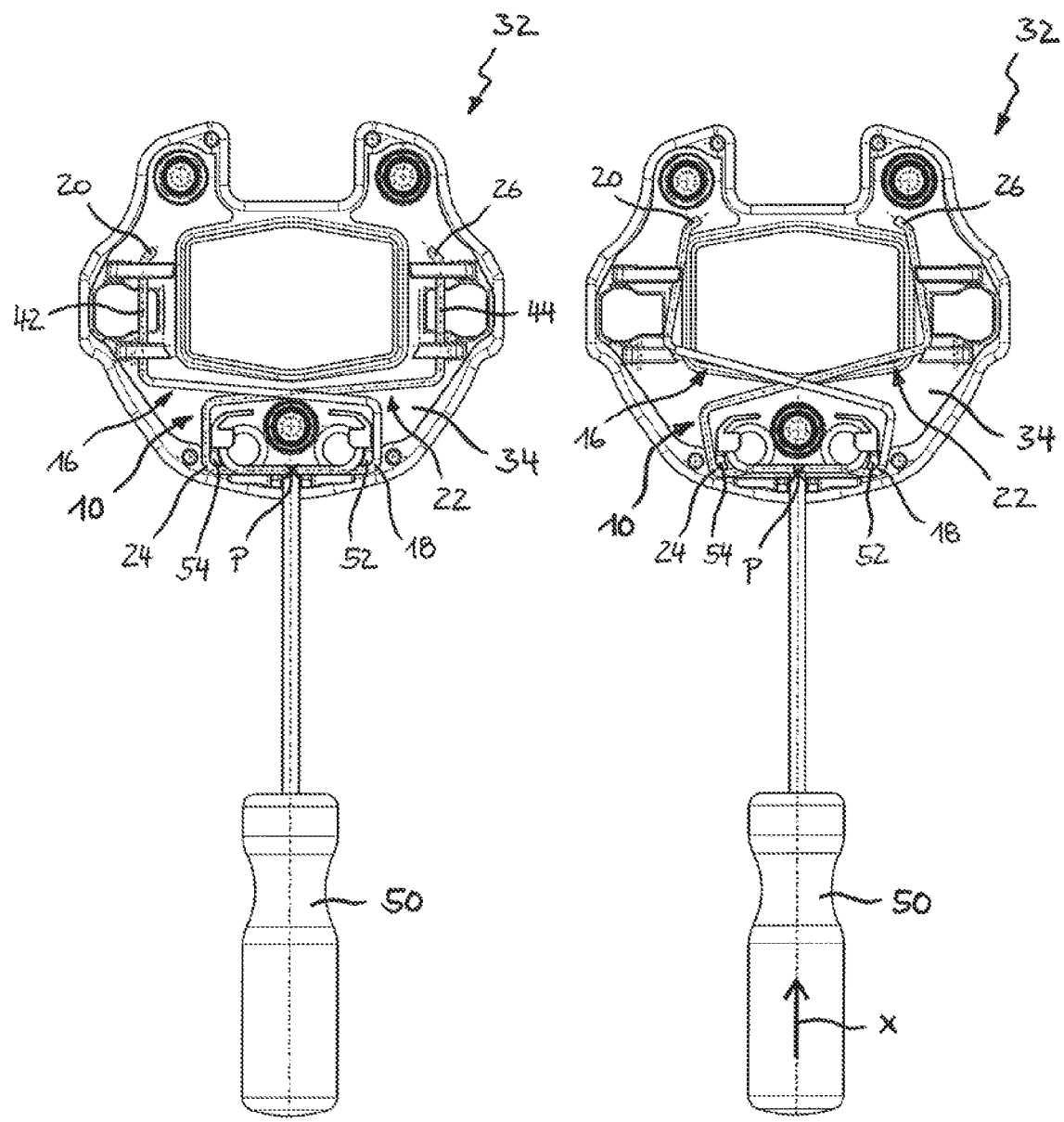
FIG. 5 shows a top view of a tool and of the steering wheel assembly according to FIG. 3 in a locked state.
FIG. 6 shows a top view of a tool and of the steering wheel assembly according to FIG. 3 in an unlocked state.

FIGS. 5 and 6 illustrate the unit according to FIGS. 3 and 4, wherein a tool 50 acts on each tool access point P of the spring element 10. In FIG. 5, load is not yet exerted on the tool 50 in the actuating direction x so that the spring element 10 is in its non-actuated relaxed idle position in which the airbag module 12 is safely fastened, especially locked, to the vehicle steering wheel 14, for example. In FIG. 6, the tool access point P is displaced in the actuating direction x via a load applied to the tool 50.

The fastening element 34 has a spring bearing 52 abutting on the first bearing point 18 and another spring bearing 54 abutting on the second bearing point 24, each spring bearing 52, 54 being in the form of a pivot bearing. This means that in the area of the spring bearings 52, 54 the spring element 10 cannot displace in the actuating direction x but can merely rotate about the respective spring bearing 52, 54. In particular, in the area of the spring bearings 52, 54 no translational displacement of the spring element 10 is possible at all.

Accordingly, the spring element 10 in FIG. 6 is tensioned by the movement of the tool access point P in the actuating direction x and is resiliently deformed such that the free spring ends 20, 26 will move toward each other. The retaining portions 42, 44 according to FIG. 8 can release retaining hooks 56 of the airbag module 12, for example, so that the airbag module 12 can be detached from the fastening element 34 fixed to the steering wheel skeleton 36. Unless load is exerted on the tool 50 in the actuating direction x any more, the spring element 10 will relax and adopt its position according to FIG. 5 again.

Figure 7:
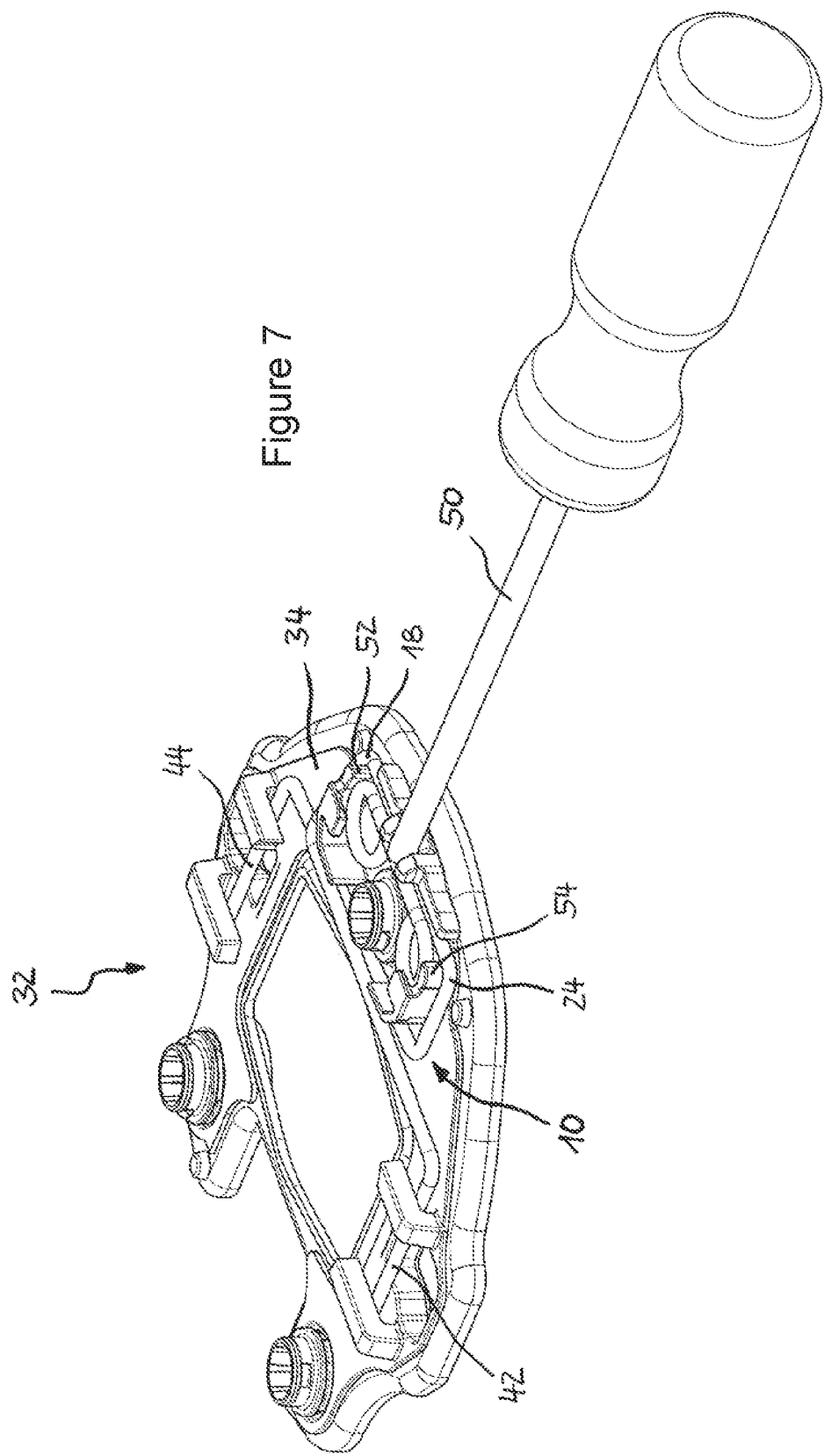
FIG. 7 shows a perspective view of the tool and the steering wheel assembly according to FIG. 5.

A perspective view of the unit according to FIG. 5 is shown in FIG. 7, where the two spring bearings 52, 54 of the assembly component in the form of the fastening element 34 are clearly visible.

FIG. 8 illustrates the steering wheel assembly 32 of a vehicle, comprising an airbag module 12, a vehicle steering wheel 14 and a unit according to FIGS. 5 to 7, with the fastening element 34 of the unit being tightly connected to the steering wheel skeleton 36 of the vehicle steering wheel 14. The airbag module 12 is fastened to the vehicle steering wheel 14 via the retaining hooks 56 and the retaining portions 42, 44 of the spring element 10.

In FIG. 9, a detail of the steering wheel assembly 32 according to FIG. 8 is shown. It is evident herefrom that the tool access point P can be easily reached by the tool 50 when the steering wheel assembly 32 is completely assembled and is displaceable in the actuating direction x by simple pressure so that the airbag module 12 can be removed from the vehicle steering wheel 14 with low effort.

The invention claimed is:

1. A spring element for fastening an airbag module (12) to a vehicle steering wheel (14) comprising:
 a first spring section (16) which extends from a tool access point (P) via a first bearing point (18) as far as a first free spring end (20), and
 a second spring section (22) which extends from the tool access point (P) via a second bearing point (24) as far as a second free spring end (26),
 wherein the first spring section between the first bearing point and the first free spring end intersects the second spring section between the second bearing point and the second free spring end.

2. The spring element according to claim 1, wherein the spring element (10) is made from bent wire as a one-piece component.

3. The spring element according to claim 1, wherein the two spring sections (16, 22) are substantially symmetric with respect to a spring axis (A) extending through the tool access point (P).

4. The spring element according to claim 3, wherein the actuating direction coincides with an axial direction of the spring axis.

5. The spring element according to claim 1, wherein between the two bearing points (18, 24) at least one coiled spring section (30) is provided.

6. The spring element according to claim 5, wherein the tool access point (P) is provided at the at least one coiled spring section (30).

7. The spring element according to claim 1,
 wherein the tool access point (P) is spaced apart from a connecting section (28) between the two free spring ends (20, 26) and is displaceable in an actuating direction (x) toward the connecting section (28),
 wherein the spring sections (16, 22) are shaped such that the free spring ends (20, 26) move toward each other or away from each other during displacement of the tool access point (P) in the actuating direction (x), if the first bearing point (18) and the second bearing point (24) are held substantially non-displaceably in the actuating direction (x).

8. The spring element according to claim 1, wherein the spring sections pivot away from one another about the bearing points in response to displacement of the tool access point in the actuating direction.

9. The spring element according to claim 1, wherein the tool access point is displaceable in the actuating direction toward the connecting section to place the spring element in an unlocked state.

10. A steering wheel assembly of a vehicle, comprising:
a spring element (10) according to claim 1, and
an assembly component to which the spring element (10) is fastened,
wherein the assembly component includes a spring bearing (52) abutting on the first bearing point (18) and another spring bearing (54) abutting on the second bearing point (24).

11. The steering wheel assembly according to claim 10, wherein the assembly component is a steering wheel skeleton (36), an airbag module (12) or a separate fastening element (34) which can be tightly mounted to the steering wheel skeleton (36) or to the airbag module (12).

12. The spring element according to claim 10, wherein the spring bearings are pivot bearings.

13. The spring element according to claim 1, wherein a respective spring leg (38, 40) which includes a retaining portion (42, 44) extends between the bearing point (18, 24) and the associated free spring end (20, 26) of the spring sections (16, 22).

14. The spring element according to claim 13, wherein the spring leg (38, 40) is substantially Z-shaped.

15. The spring element according to claim 13, wherein the retaining portion abuts on the free spring end.

16. The spring element according to claim 13, wherein a space (46) between the bearing point (18, 24) and the retaining portion (42, 44) is larger than a space (48) between the bearing point (18, 24) and the tool access point (P).

17. The spring element according to claim 16, wherein the retaining portion is at least three times larger than the space between the bearing point and the tool access point.

18. A spring element for fastening an airbag module (12) to a vehicle steering wheel (14), comprising:
a first spring section (16) which extends from a tool access point (P) via a first bearing point (18) as far as a first free spring end (20), and
a second spring section (22) which extends from the tool access point (P) via a second bearing point (24) as far as a second free spring end (26),
wherein between the two bearing points (18, 24) two coiled spring sections (30) are provided, with the tool access point (P) being arranged between the two coiled spring sections (30),
wherein the tool access point (P) is spaced apart from a connecting section (28) between the two free spring ends (20, 26) and is displaceable in an actuating direction (x) toward the connecting section (28),
wherein the spring sections (16, 22) are shaped such that the free spring ends (20, 26) move toward each other or away from each other during displacement of the tool access point (P) in the actuating direction (x), if the first bearing point (18) and the second bearing point (24) are held substantially non-displaceably in the actuating direction (x).

* * * * *